(12) United States Patent
Ma

(10) Patent No.: US 11,324,200 B2
(45) Date of Patent: May 10, 2022

(54) DUAL-PURPOSE DOG TRAINING DEVICE

(71) Applicant: SunSun Electronic Technology Inc., Boulder, CO (US)

(72) Inventor: Huixin Ma, Boulder, CO (US)

( * ) Notice: Subject to any disclaimer, the term of this patent is extended or adjusted under 35 U.S.C. 154(b) by 234 days.

(21) Appl. No.: 16/820,850

(22) Filed: Mar. 17, 2020

(65) Prior Publication Data

US 2021/0289748 A1     Sep. 23, 2021

(51) Int. Cl.
    *A01K 15/02*    (2006.01)

(52) U.S. Cl.
    CPC .......... *A01K 15/021* (2013.01); *A01K 15/022* (2013.01); *A01K 15/023* (2013.01)

(58) Field of Classification Search
    CPC .... A01K 15/02; A01K 27/009; A01K 15/021; A01K 15/022
    USPC ................. 119/712, 720, 721, 718, 719, 908
    See application file for complete search history.

(56) References Cited

U.S. PATENT DOCUMENTS

| | | | | |
|---|---|---|---|---|
| 5,799,618 A * | 9/1998 | Van Curen | ........... | A01K 15/022 119/718 |
| 6,431,121 B1 * | 8/2002 | Mainini | ............... | A01K 15/022 119/718 |
| 7,658,166 B1 * | 2/2010 | Rheinschmidt, Jr. | ........... | A01K 15/022 119/718 |
| 2003/0116101 A1 * | 6/2003 | Kim | ...................... | A01K 15/021 119/720 |
| 2006/0011144 A1 * | 1/2006 | Kates | ..................... | A01K 15/02 119/719 |
| 2008/0072841 A1 * | 3/2008 | So | ......................... | A01K 15/022 119/718 |

* cited by examiner

*Primary Examiner* — Yvonne R Abbott-Lewis
(74) *Attorney, Agent, or Firm* — Rumit Ranjit Kanakia

(57) ABSTRACT

The utility model discloses a dual-purpose dog training device including a remote controller and a receiver. The remote controller is provided with a function switching key. A main control board is connected to at least one of a vibration motor or an ultrasonic generator or an electric shock electrode. The main control board is provided with a dog training control unit and a bark stopping control unit, respectively. The dog training control unit or the bark stopping control unit is separately connected to the vibration motor or the ultrasonic generator or the electric shock electrode, respectively. The main control board receives an instruction of the function switching key to switch a control unit for controlling the vibration motor or the ultrasonic generator or the electric shock electrode between the dog training control unit and the bark stopping control unit, so as to switch an operating mode of the receiver between a dog training mode and a bark stopping mode. The dual-purpose dog training device provided by the utility model may be used as both a dog training device and a bark stopping device. By pressing the function switching key, the receiver may be switched between two function modes of the dog training device and the bark stopping device.

6 Claims, 4 Drawing Sheets

DUAL-PURPOSE DOG TRAINING DEVICE

TECHNICAL FIELD

The utility model relates to pet electronic products, and more particularly, to a dual-purpose dog training device.

BACKGROUND

Many dog trainers have tried a forced method in the past, which is still used today. The method of forcing dogs to obey by corporal punishment is the least scientific. Like other animals, dogs are very alert to human beings. From a dog's standpoint, being beaten and kicked for unknown reasons can only create the impression of "being mistreated". For a very powerful owner, dogs may obey because of fear. However, dogs growing up in this environment are extremely insecure, sometimes attack weak children or elderly people, and even cause dangerous events of bite injuries.

Pet dogs easily bark when stimulated by external sounds, thereby affecting others. In order to prevent pet dogs from barking frequently or for too long, people further designed bark stopping devices. When pet dogs bark loudly, the pet dogs stop barking by being stimulated.

The existing dog training device and bark stopping device are two different electronic products, and there is no electronic device integrating two functions together.

SUMMARY

An object of the utility model is to provide a dual-purpose dog training device. The dog training device may also be used as a bark stopping device when necessary.

According to an aspect of the utility model, a dual-purpose dog training device is provided. The dual-purpose dog training device includes a remote controller and a receiver.

The remote controller is provided with a function switching key.

The receiver includes a main control board. The main control board is connected to at least one of a vibration motor or an ultrasonic generator or an electric shock electrode.

The main control board is provided with a dog training control unit and a bark stopping control unit, respectively. The dog training control unit or the bark stopping control unit is separately connected to the vibration motor or the ultrasonic generator or the electric shock electrode, respectively. The main control board receives an instruction of the function switching key to switch a control unit for controlling the vibration motor or the ultrasonic generator or the electric shock electrode between the dog training control unit and the bark stopping control unit, so as to switch an operating mode of the receiver between a dog training mode and a bark stopping mode.

Further, the remote controller is further provided with function control keys for controlling the vibration motor or the ultrasonic generator or the electric shock electrode respectively. The function control keys are connected to the dog training control unit through wireless signals and configured to control, when the receiver is in the dog training mode, the vibration motor or the ultrasonic generator or the electric shock electrode. The function control keys are pressed so that the vibration motor or the ultrasonic generator or the electric shock electrode corresponding to the function control keys operates, so as to warn or punish a pet dog.

Further, the receiver is further provided with a pickup. The pickup is connected to the bark stopping control unit. After receiving a sound signal of barking from a pet dog when the receiver is in the bark stopping mode, the pickup issues an electric signal to the bark stopping control unit. After receiving the electric signal, the bark stopping control unit issues a bark stopping instruction, so that at least one of the vibration motor or the ultrasonic generator or the electric shock electrode operates to warn or punish the barking pet dog.

Specifically, the receiver operates in only one operating mode of the dog training mode and the bark stopping mode at the same time.

Preferably, the function switching key is also a power on-off key of the remote controller. When the remote controller is in an on state, the function switching key is pressed, and after the remote controller issues a signal for switching the receiver to the bark stopping mode, the remote controller is turned off. When the remote controller is in an off state, the function switching key is pressed, and after the remote controller is turned on, a signal for switching the receiver to the dog training mode is issued.

Further, the pickup is further connected in series with a double-touch switch module. If and only if the pickup detects two sound signals continuously within 5 to 10 seconds, the double-touch switch module is turned on, and the main control board issues the bark stopping instruction.

Specifically, the double-touch switch module includes two NAND gates and a timer. The two NAND gates are both triggered to be turned on by the pickup. When the pickup receives a sound signal for the first time, the first NAND gate is turned on and the timer starts to operate. If and only if the pickup detects a sound again within 5 to 10 seconds, the second NAND gate is turned on, and the main control board issues the bark stopping instruction.

Specifically, the double-touch switch module includes a delay switch and a common switch connected in series sequentially. The common switch is triggered to be turned on by the pickup through the delay switch. When the pickup receives a sound signal for the first time, the delay switch is turned on for 5 to 10 seconds and then turned off. If the pickup detects a sound again within 5 to 10 seconds, the common switch is turned on, and the main control board issues the bark stopping instruction.

The dual-purpose dog training device provided by the utility model may be used as both a dog training device and the bark stopping device. By pressing the function switching key, the receiver may be switched between two function modes of the dog training device and the bark stopping device. When functioning as the bark stopping device, the remote controller may be turned off, which, firstly, can facilitate operation and prevent signal errors, and secondly, can also save the power of the remote controller. By setting the function switching key as the power on-off key of the remote controller, the operating mode of the receiver may be switched while the remote controller is turned on or off. Therefore, it is more convenient to use. In addition, the double-touch switch module is further used in the receiver. If and only if the pickup detects two sound signals continuously within 5 to 10 seconds, the main control board will issue the bark stopping instruction. Therefore, the probability of misjudgment of the bark stopping device can be greatly reduced, the role of training dogs can be better played, and the pet dogs can be assisted in developing good habits.

DETAILED DESCRIPTION

The utility model is illustrated in further detail below with reference to the drawings.

Embodiment 1

Figure 1:
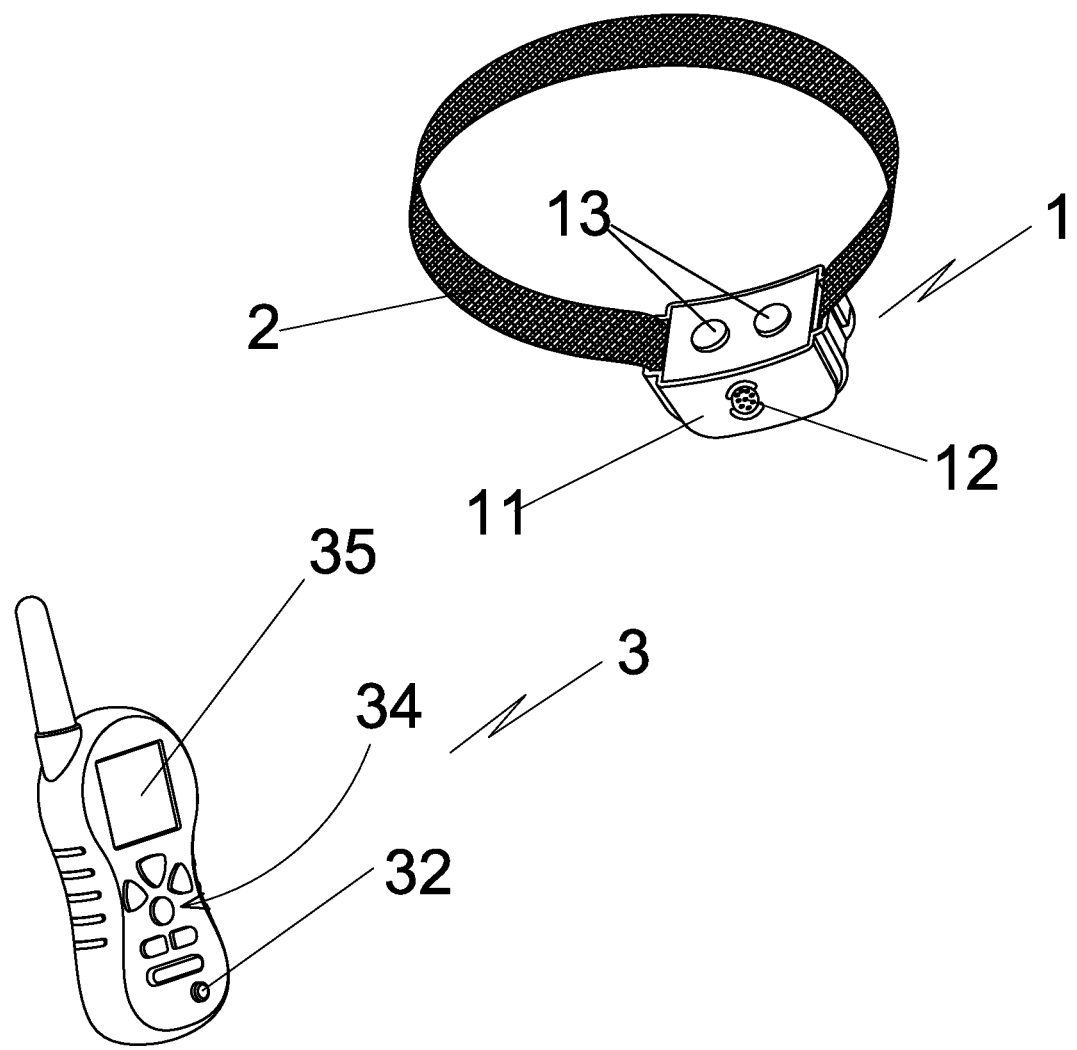
FIG. 1 is a schematic structural diagram of a dual-purpose dog training device according to an embodiment of the utility model.
Figure 2:
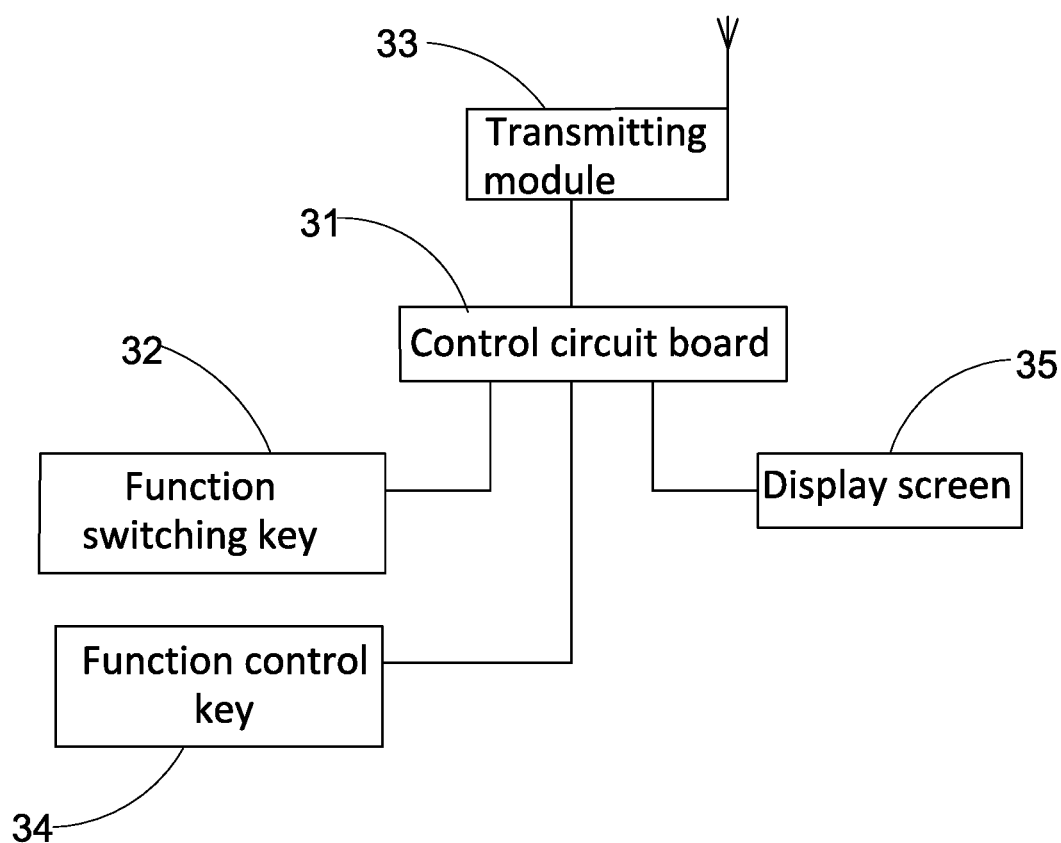
FIG. 2 is a schematic circuit diagram of a remote controller in FIG. 1.
Figure 3:
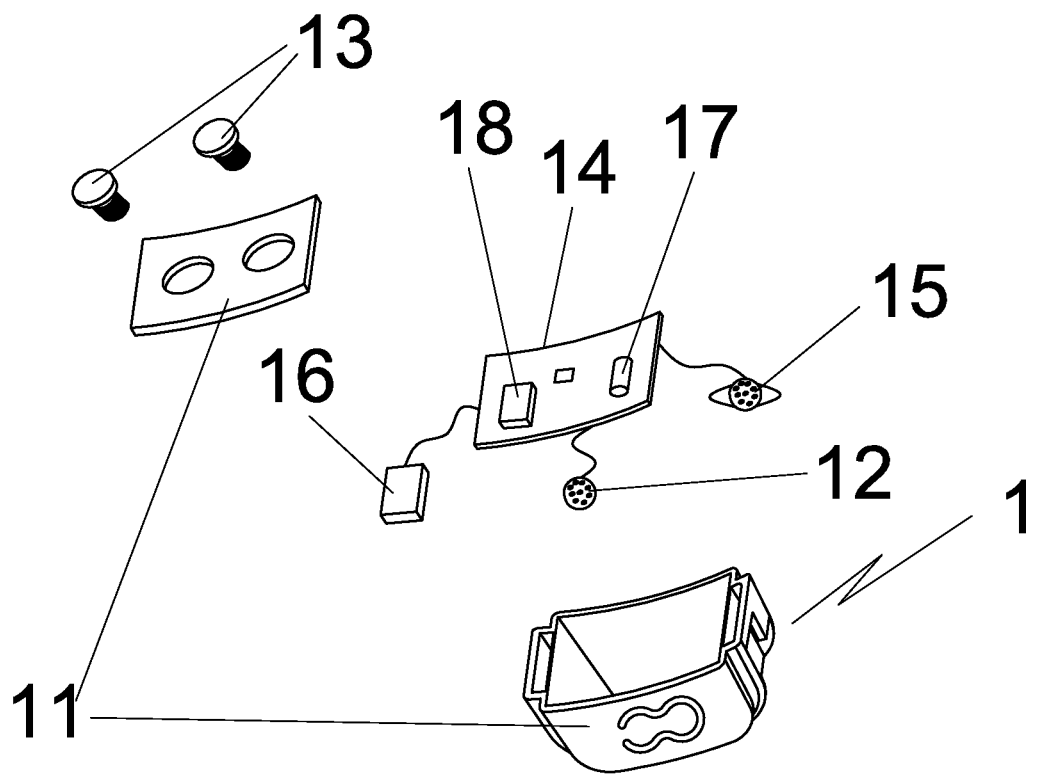
FIG. 3 is an assembly diagram of a receiver in FIG. 1.
Figure 4:
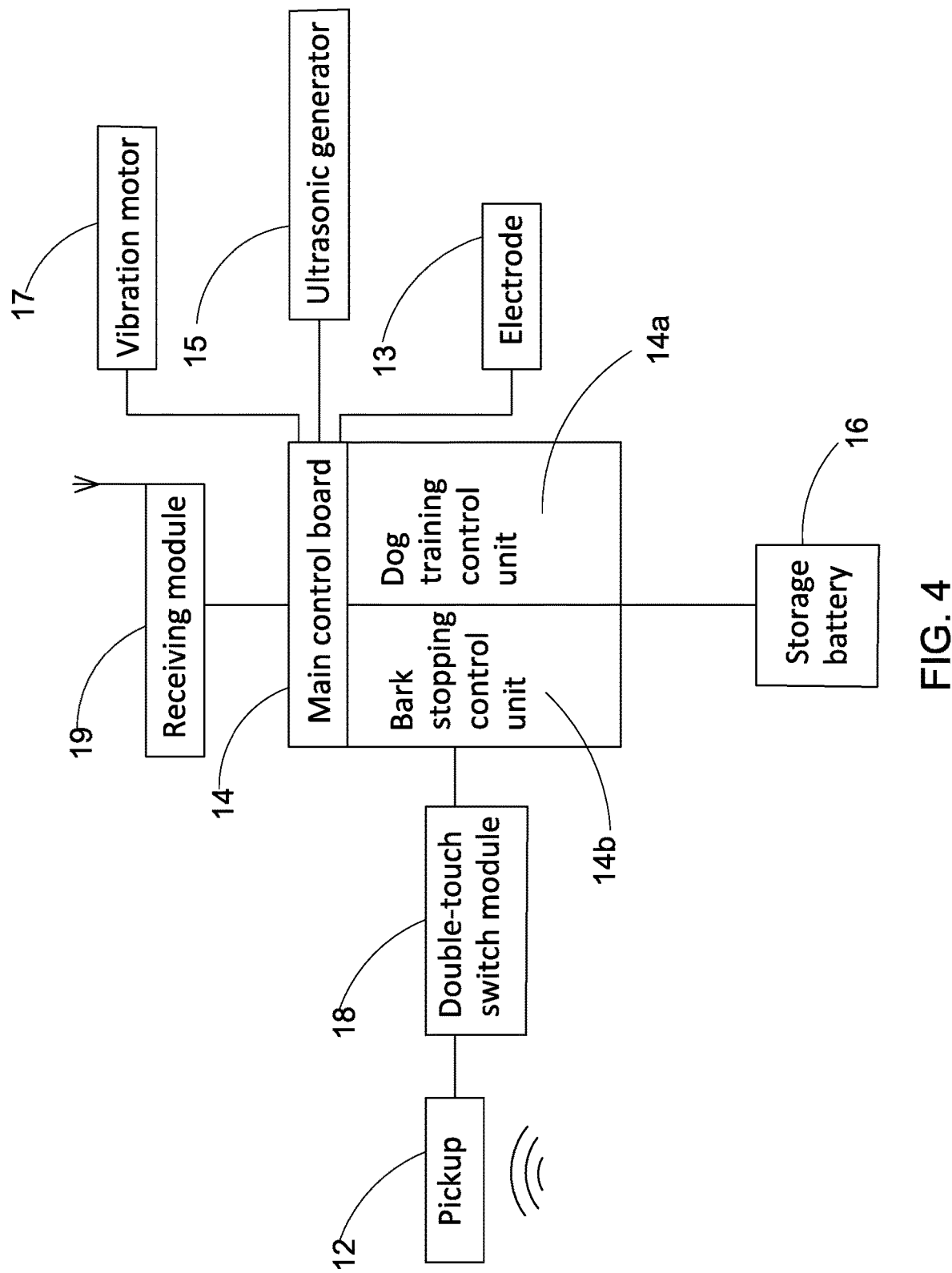
FIG. 4 is a schematic circuit diagram of the receiver in FIG. 3.

FIG. 1 to FIG. 4 schematically show a dual-purpose dog training device according to an embodiment of the utility model. As shown in the figures, the device includes a remote controller 3 and a receiver 1.

The remote controller 3 is provided with a control circuit board 31, a function switching key 32, a transmitting module 33, function control keys 34, and a display screen 35. The function switching key 32, the transmitting module 33, the function control keys 34 and the display screen 35 are connected to the control circuit board 31, respectively.

The receiver 1 is generally fixed on the neck of a pet dog by a strap 2.

The receiver 1 includes a housing 11 and a main control board 14 disposed inside the housing 11. A pickup 12 is further disposed inside the housing 11.

The main control board 14 is further connected to a storage battery 16. The storage battery 16 is a dry battery or a rechargeable battery, and is configured to supply power to the main control board 14.

An electrode 13 is further disposed outside the housing 11, and the electrode 13 is close to the skin of an animal. The electrode 13 is connected to the main control board 14 and receives an instruction from the main control board 14.

A vibration motor 17 and an ultrasonic generator 15 are further disposed inside the housing 11. The vibration motor 17 and the ultrasonic generator 15 are connected to the main control board 14 respectively and receive instructions from the main control board 14.

The main control board 14 is provided with a dog training control unit 14a and a bark stopping control unit 14b, respectively.

The main control board 14 is further connected to a receiving module 19 for receiving a signal from the transmitting module 33. The receiving module 19 matches the transmitting module 33.

After the function switching key 32 is pressed, the control circuit board 31 transmits an instruction for switching an operating mode through the transmitting module 33 as a wireless signal. After the receiving module 19 receives the instruction, a control unit for controlling the vibration motor 17, the ultrasonic generator 15 and the electric shock electrode 13 is switched between the dog training control unit 14a and the bark stopping control unit 14b, so as to switch an operating mode of the receiver 1 between a dog training mode and a bark stopping mode.

The function control keys 34 are connected to the dog training control unit 14a through wireless signals, and configured to control, when the receiver 1 is in the dog training mode, the vibration motor 17 or the ultrasonic generator 15 or the electric shock electrode 13. The function control keys 34 are pressed so that the vibration motor 17 or the ultrasonic generator 15 or the electric shock electrode 13 corresponding to the function control keys operates, so as to warn or punish the pet dog.

The receiver 1 is further provided with a pickup 12. The pickup 12 is connected to the bark stopping control unit 14b. After receiving a sound signal of barking from the pet dog when the receiver 1 is in the bark stopping mode, the pickup 12 issues an electric signal to the bark stopping control unit 14b. After receiving the electric signal, the bark stopping control unit 14b issues a bark stopping instruction, so that at least one of the vibration motor 17 or the ultrasonic generator 15 or the electric shock electrode 13 operates to warn or punish the barking pet dog.

Generally, the receiver 1 operates in only one operating mode of the dog training mode and the bark stopping mode at the same time.

In the present embodiment, the function switching key 32 is also used as a power on-off key of the remote controller 3. When the remote controller 3 is in an on state, the function switching key 32 is pressed, and after the control circuit board 31 issues a signal for switching the receiver 1 to the bark stopping mode through the transmitting module 33, the remote controller 3 is turned off. When the remote controller 3 is in an off state, the function switching key 32 is pressed, so that the remote controller 3 is turned on, and a signal for switching the receiver 1 to the dog training mode is issued.

In the present embodiment, the pickup 12 is further connected in series with a double-touch switch module 18.

When the pickup 12 detects the external sound signal, the double-touch switch module 18 is triggered.

If and only if the pickup 12 detects two sound signals continuously within a preset time, the double-touch switch module 18 may be turned on, the bark stopping control unit 14b is enabled to issue the bark stopping instruction, and the receiver 1 warns or punishes the animal by vibration or ultrasonic waves or electric shocks.

The preset time is generally 5 to 10 seconds.

The double-touch switch module 18 includes two NAND gates and a timer. The two NAND gates are both triggered to be turned on by the pickup 12. When the pickup 12 receives a sound signal for the first time, the first NAND gate is turned on and the timer starts to operate. If and only if the pickup 12 detects a sound again within 5 to 10 seconds, the second NAND gate is turned on, and the bark stopping control unit 14b issues the bark stopping instruction.

The NAND gate and timer here are commonly used pins of a single-chip microcomputer, which may be led out and used through corresponding line connection.

When the double-touch switch module 18 is turned on, the bark stopping control unit 14b controls the vibration motor 17 to generate vibration, or controls the ultrasonic generator 15 to emit ultrasonic waves, or controls the electrode 13 to perform a high-voltage micro-current electric shock, so as to warn the barking pet dog.

The dual-purpose dog training device provided by the utility model may be used as both a dog training device and a bark stopping device. By pressing the function switching key, the receiver may be switched between two function modes of the dog training device and the bark stopping device. When functioning as the bark stopping device, the remote controller may be turned off, which, firstly, can facilitate operation and prevent signal errors, and secondly, can also save the power of the remote controller. By setting the function switching key as the power on-off key of the remote controller, the operating mode of the receiver may be switched while the remote controller is turned on or off. Therefore, it is more convenient to use. In addition, the double-touch switch module is further used in the receiver. If and only if the pickup detects two sound signals continuously within 5 to 10 seconds, the main control board will issue the bark stopping instruction. Therefore, the probability of misjudgment of the bark stopping device can be greatly reduced, the role of training dogs can be better played, and the pet dogs can be assisted in developing good habits.

Embodiment 2

The difference from Embodiment 1 is that a double-touch switch module 18 includes a delay switch and a common switch connected in series sequentially. The common switch is triggered to be turned on by the pickup 12 through the delay switch. When the pickup 12 receives a sound signal for the first time, the delay switch is turned on for 5 to 10 seconds and then turned off. When the pickup 12 detects a sound again within 5 to 10 seconds, the common switch is turned on, and the bark stopping control unit 14b issues the bark stopping instruction.

When the double-touch switch module 18 is turned on, the bark stopping control unit 14b first controls the vibration motor 17 to generate the vibration, or controls the ultrasonic generator 15 to emit the ultrasonic waves, so as to warn the animal.

When the double-touch switch module 18 is turned on to warn the animal, the pickup 12 detects a sound signal again, and the bark stopping control unit 14b controls the electrode 13 to generate the electric shock, so as to punish the animal.

What have been described above are only some embodiments of the utility model. For those of ordinary skill in the art, without departing from the inventive concept of the utility model, several modifications and improvements can be made, which all belong to the protection scope of the utility model.

What is claimed is:

1. A dual-purpose dog training device, comprising a remote controller and a receiver, wherein the remote controller is provided with a function switching key;
the receiver comprises a main control board, the main control board being connected to at least one of a vibration motor or an ultrasonic generator or an electric shock electrode; and
the main control board is provided with a dog training control unit and a bark stopping control unit, respectively, the dog training control unit or the bark stopping control unit is separately connected to the vibration motor or the ultrasonic generator or the electric shock electrode, respectively, and the main control board receives an instruction of the function switching key to switch a control unit for controlling the vibration motor or the ultrasonic generator or the electric shock electrode between the dog training control unit and the bark stopping control unit, so as to switch an operating mode of the receiver between a dog training mode and a bark stopping mode,
wherein the receiver is further provided with a pickup, the pickup is connected to the bark stopping control unit, after receiving a sound signal of barking from a pet dog when the receiver is in the bark stopping mode, the pickup issues an electric signal to the bark stopping control unit, and after receiving the electric signal, the bark stopping control unit issues a bark stopping instruction, so that at least one of the vibration motor or the ultrasonic generator or the electric shock electrode operates to warn or punish the barking pet dog, and
wherein the function switching key is also a power 'ON'-'OFF' key of the remote controller; when the remote controller is in an 'ON' state, the function switching key is pressed, and after the remote controller issues a signal for switching the receiver to the bark stopping mode, the remote controller is turned 'OFF', and when the remote controller is in an 'OFF' state, the function switching key is pressed and after the remote controller is turner 'ON', a signal for switching the receiver to the dog training mode is issued.

2. The dual-purpose dog training device according to claim 1, wherein the remote controller is further provided with function control keys for controlling the vibration motor or the ultrasonic generator or the electric shock electrode respectively, the function control keys are connected to the dog training control unit through wireless signals and configured to control, when the receiver is in the dog training mode, the vibration motor or the ultrasonic generator or the electric shock electrode, and the function control keys are pressed so that the vibration motor or the ultrasonic generator or the electric shock electrode corresponding to the function control keys operates, so as to warn or punish a pet dog.

3. The dual-purpose dog training device according to claim wherein the receiver operates in only one operating mode of the dog training mode and the bark stopping mode at the same time.

4. A dual-purpose dog training device, comprising a remote controller and a receiver, wherein
the remote controller is provided with a function switching key;
the receiver comprises a main control board, the main control board being connected to at least one of a vibration motor or an ultrasonic generator or an electric shock electrode; and
the main control board is provided with a dog training control unit and a bark stopping control unit, respectively, the dog training control unit or the bark stopping control unit is separately connected to the vibration motor or the ultrasonic generator or the electric shock electrode, respectively, and the main control board receives an instruction of the function switching key to switch a control unit for controlling the vibration motor or the ultrasonic generator or the electric shock electrode between the dog training control unit and the bark stopping control unit, so as to switch an operating mode of the receiver between a dog training mode and a bark stopping mode,
wherein the receiver is further provided with a pickup, the pickup is connected to the bark stopping control unit, after receiving a sound signal of barking from a pet dog when the receiver is in the bark stopping mode, the pickup issues an electric signal to the bark stopping control unit, and after receiving the electric signal, the bark stopping control unit issues a bark stopping instruction, so that at least one of the vibration motor or the ultrasonic generator or the electric shock electrode operates to warn or punish the barking pet dog, and
wherein the pickup is further connected in series with a double-touch switch module, if and only if the pickup detects two sound signals continuously within 5 to 10 seconds, the double-touch switch module is turned on, and the main control board issues the bark stopping instruction.

5. The dual-purpose dog training device according to claim 4, wherein the double-touch switch module comprises two NAND gates and a timer, the two NAND gates are both triggered to be turned on by the pickup, when the pickup receives a sound signal for the first time, the first NAND gate is turned on and the timer starts to operate, if and only if the pickup detects a sound again within 5 to 10 seconds, the second NAND gate is turned on, and the main control board issues the bark stopping instruction.

6. The dual-purpose dog training device according to claim 4, wherein the double-touch switch module comprises a delay switch and a common switch connected in series sequentially, the common switch is triggered to be turned on by the pickup through the delay switch, when the pickup receives a sound signal for the first time, the delay switch is turned on for 5 to 10 seconds and then turned off, when the pickup detects a sound again within 5 to 10 seconds, the common switch is turned on, and the main control board issues the bark stopping instruction.

* * * * *